United States Patent
Büttner et al.

[11] Patent Number: 5,245,644
[45] Date of Patent: Sep. 14, 1993

[54] SPACER FOR A FUEL ASSEMBLY OF A PRESSURIZED WATER REACTOR

[75] Inventors: Martin Büttner, Heroldsbach; Josef Steven, Neunkirchen am Brand, both of Fed. Rep. of Germany

[73] Assignee: Siemens Aktiengesellschaft, Munich, Fed. Rep. of Germany

[21] Appl. No.: 822,336

[22] Filed: Jan. 17, 1992

[30] Foreign Application Priority Data

Jan. 18, 1991 [DE] Fed. Rep. of Germany ... 9100577[U]

[51] Int. Cl.$^5$ .............................................. G21C 3/34
[52] U.S. Cl. ................................... 376/442; 376/441; 376/462; 376/438
[58] Field of Search ............... 376/441, 438, 439, 462, 376/442; 976/DIG. 71, DIG. 74, DIG. 75

[56] References Cited

U.S. PATENT DOCUMENTS

| | | | |
|---|---|---|---|
| 3,844,887 | 10/1974 | Georges et al. | 376/442 |
| 4,028,180 | 6/1977 | Finch | 376/442 |
| 4,578,239 | 3/1986 | Steinke | 376/441 |
| 4,726,926 | 2/1988 | Patterson et al. | 376/439 |

Primary Examiner—Donald P. Walsh
Assistant Examiner—Meena Chelliah
Attorney, Agent, or Firm—Herbert L. Lerner; Laurence A. Greenberg

[57] ABSTRACT

A spacer for a fuel assembly of a pressurized water reactor includes a first group of first webs standing on end and extending parallel to one another in a plane. Each of the first webs has longer sides and shorter sides. One of the longer sides of each of the first webs has a slit formed therein with a narrowed point and an impressed indentation. A second group of second webs stand on end and extend at right angles to the first webs. Each of the second webs has longer sides and shorter sides. Another of the longer sides of each of the second webs has a slit formed therein with a narrowed point and an impressed indentation. Each respective one of the first webs is connected to a respective one of the second webs to form a grid by inserting the webs into each other at the slits and locking the narrowed point of one web into place in the impressed indentation of another web with a plug-in connection.

10 Claims, 2 Drawing Sheets

SPACER FOR A FUEL ASSEMBLY OF A PRESSURIZED WATER REACTOR

The invention relates to a spacer for a fuel assembly of a pressurized water reactor, having a first group of first webs standing on end, extending parallel to one another in a plane and being slit on one long side thereof, a second group of second webs standing on end, extending at right angles thereto and being slit on the other long side thereof, and a plug-in connection between each one web of the first group and one respective web of the second group, in which the webs are inserted into one another by means of the slits and form a grid.

As discussed in further detail below with regard to the first drawing figure, in such a device spacer webs and especially guide lugs formed thereon cause a high pressure loss.

It is accordingly an object of the invention to provide a spacer for a fuel assembly of a pressurized water reactor, which overcomes the hereinafore-mentioned disadvantages of the heretofore-known devices of this general type and which keeps the pressure loss at the spacer as low as possible by means of different provisions. In particular, this is accomplished according to the invention by dispensing with insertion buttons and attaining a given fixation of the plug-in connections for welding through the use of impressions on the webs themselves.

With the foregoing and other objects in view there is provided, in accordance with the invention, a spacer for a fuel assembly of a pressurized water reactor, comprising a first group of first webs standing on end and extending parallel to one another in a plane, each of the first webs having longer sides and shorter sides, one of the longer sides of each of the first webs having a slit formed therein with a narrowed point and an impressed indentation; a second group of second webs standing on end and extending at right angles to the first webs, each of the second webs having longer sides and shorter sides, another of the longer sides of each of the second webs having a slit formed therein with a narrowed point and an impressed indentation; each respective one of the first webs being connected to a respective one of the second webs to form a grid by inserting the webs into each other at the slits and locking the narrowed point of one web into place in the impressed indentation of another web with a plug-in connection.

In accordance with another feature of the invention, the impressed indentation of one web has lateral beads serving as guide surfaces for the longer side having the slit of the other web, in each of the plug-in connections.

In accordance with a further feature of the invention, each of the webs has two lateral pinches forming the narrowed point.

In accordance with an added feature of the invention, each of the webs has a pinch forming the impressed indentation, and the lateral beads are formed of material positively displaced by pinching.

In accordance with a concomitant feature of the invention, the webs are welded together.

Other features which are considered as characteristic for the invention are set forth in the appended claims.

Although the invention is illustrated and described herein as embodied in a spacer for a fuel assembly of a pressurized water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
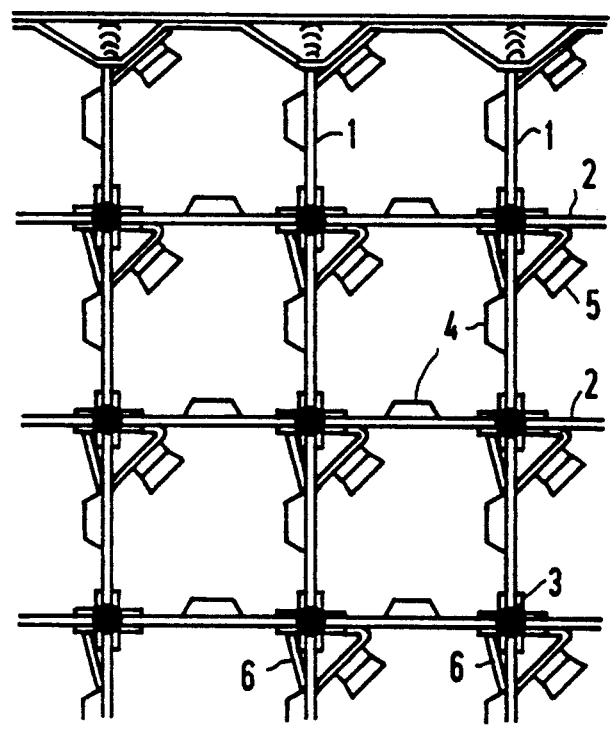
FIG. 1 is a fragmentary, diagrammatic, top-plan view of a prior art spacer.

Referring now to the figures of the drawing in detail and first, particularly, to FIG. 1 thereof, there is seen a plan view of a prior art spacer, in which a first group of first webs 1 standing on end and extending parallel to one another is disposed at right angles to a second group of second webs 2 that are also standing on end and extending parallel, in the plane of the spacers. The webs 1 are split on the one or lower longer sides thereof, for instance, while the webs 2 have corresponding slits on the other or upper longer sides thereof, so that there is a plug-in connection 3 between each web 1 and a web 2 in which the webs intersect and are inserted into one another in the slits. In order to keep the webs in the illustrated position until they are welded together, and to lend greater stability to the welded connection, the webs of the prior art device have beads or so-called insertion buttons, between which the other web is engaged and guided.

FIG. 1 also shows contact bumps 4 and springs 5, between which fuel rods of a fuel assembly are held. Flow lugs that are formed onto the webs in order to guide a coolant flow are not shown. In French or Belgian reactors, for instance, the flow lugs point into the openings of the grid formed by the spacer webs, on the trailing side of the spacer. In the prior art devices, the spacer webs and in particular the guide lugs formed onto them cause a high pressure loss.

As mentioned above, it is an object of the invention to keep the pressure loss at the spacers as low as possible by means of different provisions. Therefore, according to the invention, the insertion buttons are omitted and a certain fixation of the plug-in connections for welding is attained only by means of impressions on the webs themselves.

Figure 2:
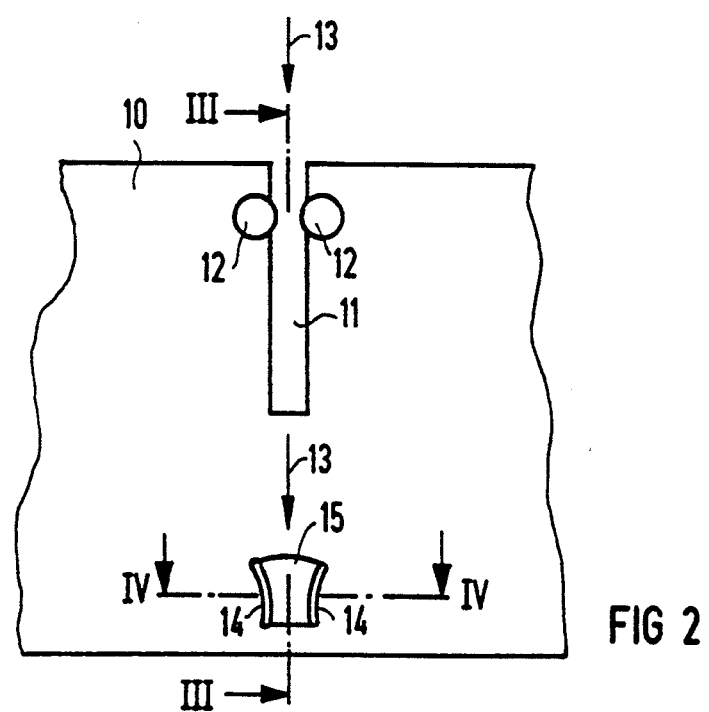
FIG. 2 is a fragmentary, side-elevational view of a spacer according to the invention.

FIG. 2 shows a web 10 of the spacer of the invention, which has applicable insertion slits 11 on one side, defining web tabs beyond the slits. The insertion slit 11 is narrowed at one point, as a result of pinching-in of an impression or impressed indentation 12 on both sides. An arrow 13 indicates an insertion direction for the other web. At that location, the web has beads 14, which are formed from the material of the web and which bulge laterally when an indentation 15 is formed by pressing inward. The beads 14 provide guidance for insertion of the slit in the web of the other group, by forming a funnel tapering in the insertion direction.

Figure 3:
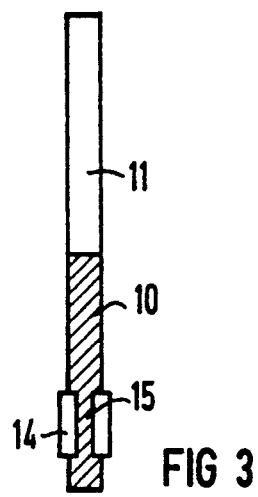
FIG. 3 is a cross-sectional view taken along the line III—III of FIG. 2, in the direction of the arrows.
Figure 4:
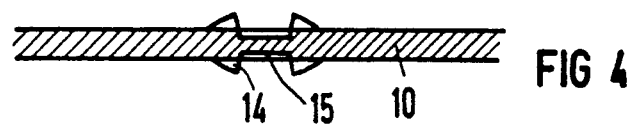
FIG. 4 is a fragmentary, longitudinal-sectional view taken along the line IV—IV of FIG. 2, in the direction of the arrows.
Figure 5:
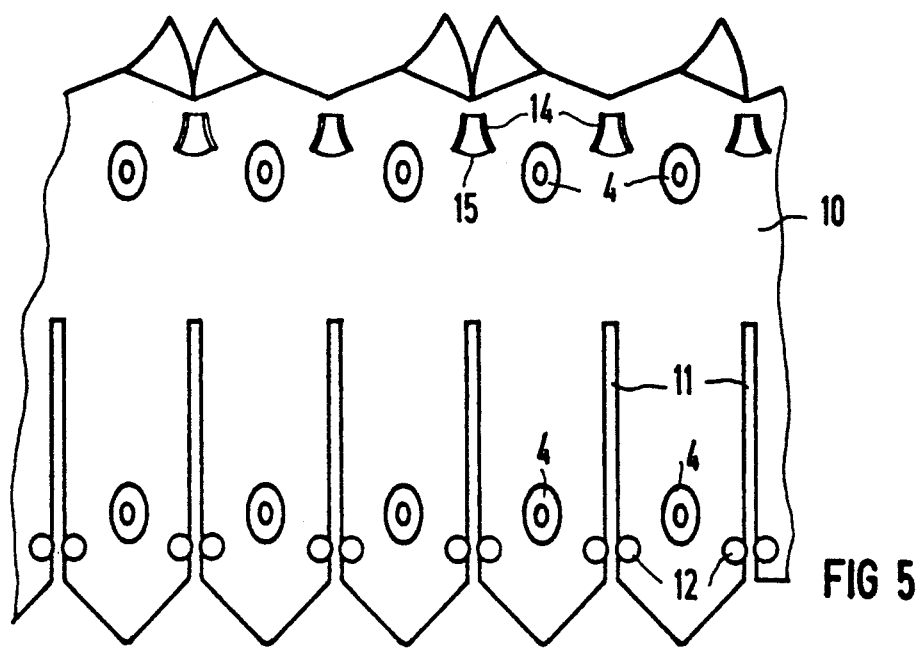
FIG. 5 is a fragmentary, side-elevational view of a spacer having a plurality of insertion slits.

FIG. 3 shows a corresponding cross section taken along the line III—III of FIG. 2. FIG. 4 shows a corresponding longitudinal section taken along the line IV—IV. In FIG. 5, a web is shown with a plurality of such insertion slits.

The novel plug-in connection is produced as follows: when the webs are inserted, the narrowed portion of one slit first scrapes over the smooth surface of the intersecting web, until a tab of the movable web is engaged by the funnel formed by the lateral beads 14 and thrust into the intended position. As it is thrust further, the movable web tab is then guided laterally, until the portion of the slit that is narrowed by the impressions 12 locks into place in the corresponding indentation 15 of the other web. The webs are then welded together.

We claim:

1. A spacer for a fuel assembly of a pressurized water reactor, comprising:
    a first group of first webs standing on end and extending parallel to one another in a plane, each of said first webs having longer sides and shorter sides, one of said longer sides of each of said first webs having a slit formed therein with a narrowed point and an impressed indentation;
    a second group of second webs standing on end and extending at right angles to said first webs, each of said second webs having longer sides and shorter sides, another of said longer sides of each of said second webs having a slit formed therein with a narrowed point and an impressed indentation;
    each respective one of said first webs being connected to a respective one of said second webs to form a grid by inserting said webs into each other at said slits and locking said narrowed point of one web into place in said impressed indentation of another web with a plug-in connection.

2. The spacer according to claim 1, wherein said impressed indentation of one web has lateral beads serving as guide surfaces for said longer side having said slit of the other web, in each of said plug-in connections.

3. The spacer according to claim 1, wherein each of said webs has two lateral pinches forming said narrowed point.

4. The spacer according to claim 2, wherein each of said webs has a pinch forming said impressed indentation, and said lateral beads are formed of material positively displaced by pinching.

5. The spacer according to claim 1, wherein said webs are welded together.

6. A spacer for a fuel assembly of a pressurized water reactor, comprising:
    a first group of first webs standing on end and extending parallel to one another in a plane, each of said first webs having longer sides and shorter sides, one of said longer sides of each of said first webs having a slit formed therein;
    a second group of second webs standing on end and extending at right angles to said first webs, each of said second webs having longer sides and shorter sides, another of said longer sides of each of said second webs having a slit formed therein;
    means for narrowing each of said slits disposed at a given first location;
    indentation means forced in each of said first and second webs at a given second location; and
    each respective one of said first webs being connected to a respective one of said second webs to form a grid by inserting said webs into each other at said slits and locking said narrowed point of one web into place in said impressed indentation means.

7. The spacer according to claim 6, wherein said indentation of one web is an impressed indentation having lateral beads serving as guide surfaces for said longer side having said slit of the other web.

8. The spacer according to claim 6, wherein said narrowing means are formed by two lateral pinches disposed at said first location in each of said first and second webs.

9. The spacer according to claim 7, wherein each of said webs has a pinch forming said impressed indentation, and said lateral beads are formed of material positively displaced by pinching.

10. The spacer according to claim 6, wherein said webs are welded together.

* * * * *